United States Patent Office 3,363,802
Patented Jan. 16, 1968

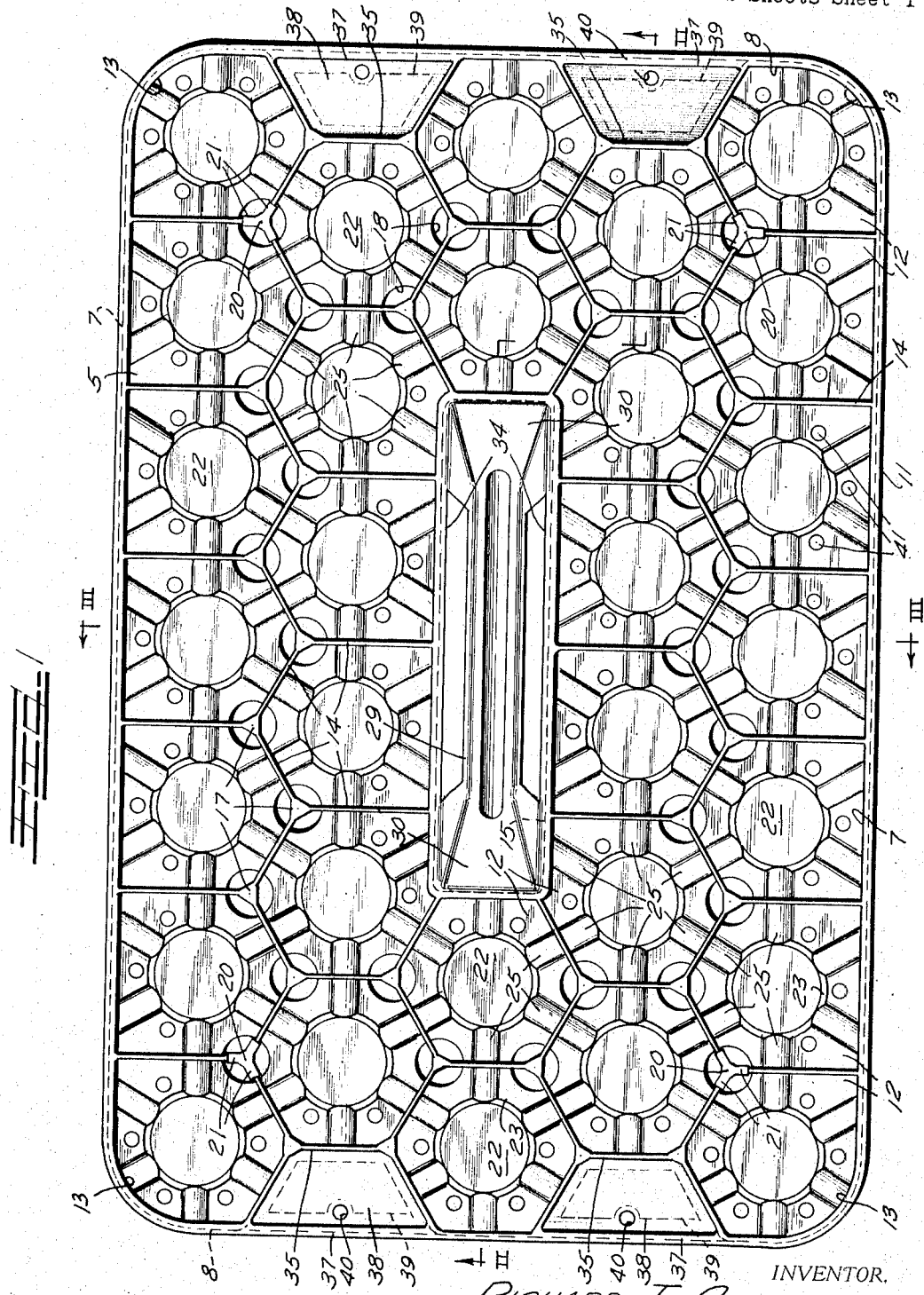

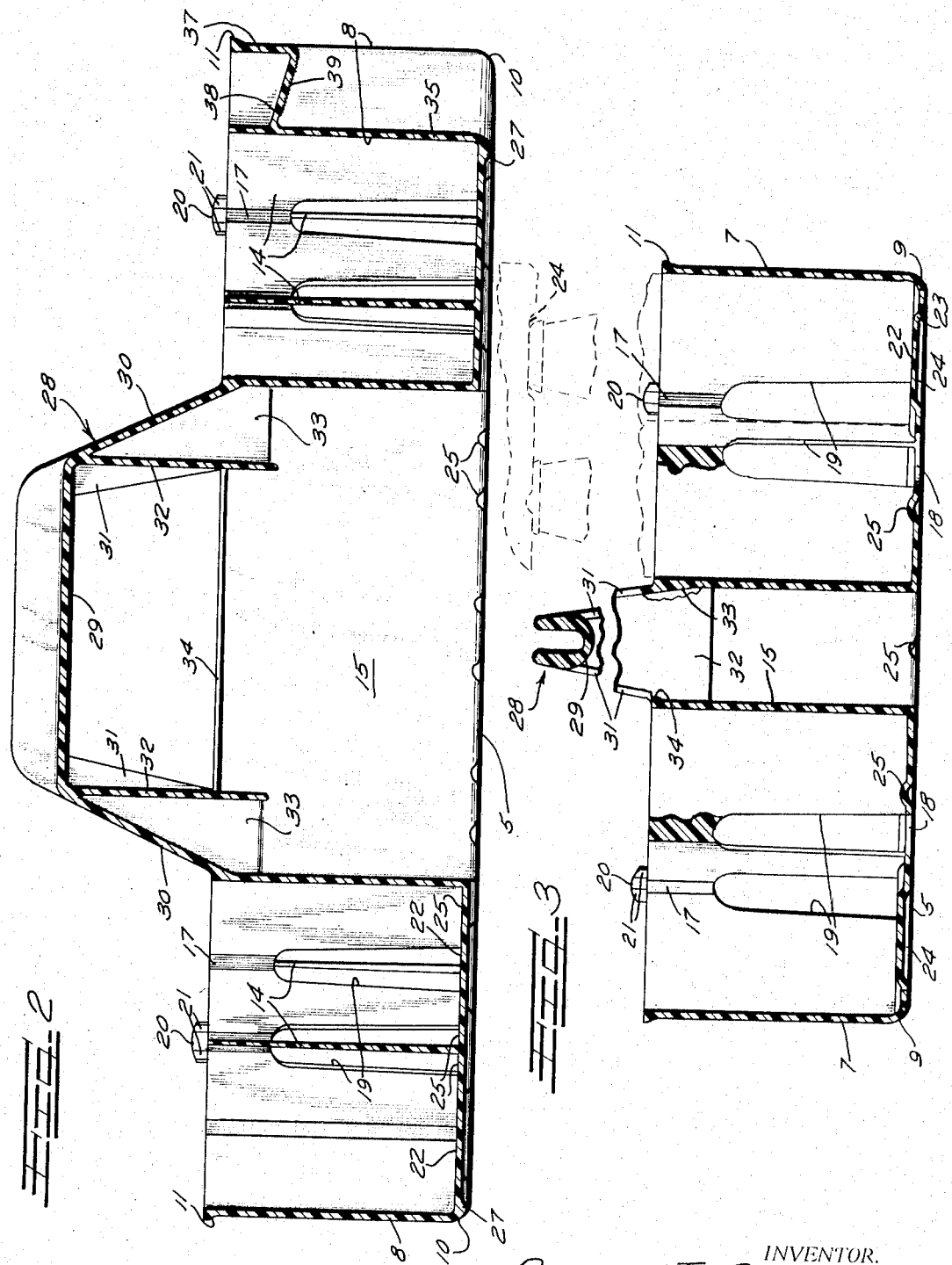

3,363,802
LARGE CAPACITY MOLDED PLASTIC BOTTLE CARRIER
Richard T. Cornelius, Minneapolis, Minn., assignor to The Cornelius Company, Anoka, Minn., a corporation of Minnesota
Filed Dec. 28, 1964, Ser. No. 421,343
13 Claims. (Cl. 220—102)

ABSTRACT OF THE DISCLOSURE

A plastic bottle carrier of generally rectangular form is subdivided into thirty bottle-receiving upwardly opening cells, has a central integral upstanding handle and has handles at each opposite end across indentations between cells which include the end walls as part of their boundaries.

---

This invention relates to improvements in bottle carriers or cases which are especially adapted for handling, transporting and storing of crown-capped beverage bottles of the six to ten ounce size, and is more particularly concerned with carriers of this type molded from suitable plastic material such as high density polyethylene in a unitary, one-piece structure.

Bottle-carrying cases have heretofore conventionally been made at least largely from wood. However, many advantages are gained from constructing bottle carriers or cases from moldable synthetic plastic material such as high density polyethylene. Among such advantages may be mentioned lighter weight as compared with wood in the same or even larger capacity carrier, lack of water absorption, easy cleaning, great durability, and substantial latitude and adaptability in shaping and configuration enabling handling of a larger number of bottles in a more compact space.

Prior attempts to produce carrying cases from molded plastic materials have run into excessive production costs due, at least in part, to the need in the prior constructions of numerous die parts including slides and the like, and slow production of relatively complex molded configurations.

An important object of the present invention is to provide a new and improved bottle carrier or case structure adapted to be made entirely as a one-piece molded plastic unit, utilizing minimum material and especially devised for high speed, economical production between a pair of mating separable forming dies, entirely eliminating any need for slides or other auxiliary die parts in forming any structural feature of the carrier.

Another object of the invention is to provide a lightweight, substantially thin shell section unitary molded plastic bottle-carrier construction of high capacity in minimum space and especially adapted for uses where refrigerated space is at a premium.

A further object of the invention is to provide a new and improved molded plastic carrier having a capacity of thirty six–ten-ounce beverage bottles.

Still another object of the invention is to provide a new and improved molded plastic bottle-carrier which has a novel unusually rugged, reinforced construction although of an essentially thin-wall shell structure.

Yet another object of the invention is to provide a new and improved molded plastic bottle-carrier with novel manipulating handle structure.

A yet further object of the invention is to provide a new and improved molded shell plastic bottle-carrier of unusually large capacity and which is especially constructed for stacking either in an unloaded condition or in a bottle filled or loaded condition.

Other objects, features and advantages of the present invention will be readily apparent from the following detailed description of a preferred embodiment thereof, taken in conjunction with the accompanying drawings, in which FIGURE 1 is a top plan view of a bottle-carrier or case embodying features of the invention;

FIGURE 2 is a longitudinal vertical sectional detail view taken substantially on the line II—II of FIGURE 1; and FIGURE 3 is a transverse vertical sectional detail view taken substantially on the line III—III of FIGURE 1.

In the embodiment of the invention selected for illustration, a carrier or case is provided for handling thirty crown-capped bottles of the six to ten ounce variety. This carrier is especially suitable for deliveries of refrigerated bottled beverages, such as fruit juices, fluid dairy products, and the like, in vending machine servicing. Refrigerated storage space in the delivery vehicles is necessarily limited.

More specifically, the present carrier is particularly adapted to be employed by smaller operators or bottlers who will hand fill the carrier, and who are not restricted to the use of conventional automatic filling machinery which has been designed to handle wooden carriers or cases. As a practical matter, therefore, this carrier is arranged to have a length and width smaller than a conventional wooden case, but to have a capacity substantially greater. Instead of the usual twenty-four bottle capacity for comparable wooden carriers, the present carrier with its thirty bottle capacity provides a load increase of 25%, with an actual reduction in over-all size. This affords quite substantial savings and other advantages where refrigerated space is at a premium in the storage, distribution and sale of cold beverage.

This carrier lends itself especially well to one-shot molding as a plastic tray in a die set consisting of but two opposed complementary die sections free from any need for slides or inserts insofar as structural features are concerned. All generally vertical surfaces of the carrier structure are fully oriented for shaping by corresponding die surfaces of either the upper or the bottom forming die section, and with ample though minimum draft for ready separation of the rigidified molded carrier from the dies. All wall areas and partitions or dividers of this carrier lend themselves to essentially minimum shell wall section thicknesses. Plastic material on the order of high density polyethylene is contemplated in the molded, substantially rigid, self-sustaining structure, and that is intended to be the connotation of the term "plastic" as used herein.

On reference to the drawings, the carrier includes a bottom wall structure 5 and an outer vertical wall comprising opposite spaced similar and coextensive side wall portions 7, and similar, coextensive opposite end wall portions 8. Integral, one-piece juncture of the base wall structure 5 with the side walls 7 is on respective radius juncture ribs 9 (FIG. 3). Reinforcing juncture of the end walls 8 with the base wall structure 5 is on rounded respective juncture ribs 10 (FIG. 2). The side and end walls 7 and 8 are of the same height and with the bottom wall 5 define a tray area of as shallow a depth as practical, having due regard to such considerations as stability of support for bottles carried therein, supportive strength and resistance to handling deformations of the carrier, and the like. On their upper ends, the side and end wall portions have a continuous integral outwardly projecting reinforcing and buffer rib 11.

Within the tray-like receptacle area defined by the outer wall structure of the carrier, a set of the desired number of upwardly opening, individual bottle-receiving cells 12 is provided comprising a longitudinal row-of-seven of the cells along each of the side wall portions 7, two longitudinal inner rows of six each of the cells respectively contiguous to the rows-of-seven, and four additional longitudinally centrally aligned cells with a pair of such cells adjacent to each end of the carrier. Thereby, thirty of the bottle-receiving cells 12 are provided, and by disposing the cells in a generally honeycomb pattern, herein comprising twelve six-sided and eighteen five-sided cells, maximum capacity in minimum tray area is attained. An increase to 33-bottle capacity is provided by eliminating a central handle (described hereinafter) and converting that area into cells.

All of the outside cells, that is, those contiguous to the outside wall defining the tray area of the carrier, have a boundary portion on the contiguous outside wall or walls. As best seen in FIGURE 1, the opposite end cells 12 of the row-of-seven include, as their outer boundaries, vertical transversely arcuate corner ribs 13 joining the respective adjacent ends of the side wall portions 7 and 8. The inside radius of curvature of the reentrant corner areas provided by the ribs 13 is substantially the same as the radius of maximum diameter bottles to be received in the respective cells of the carrier. All of the cells are divided from one another by vertical generally common divider partition webs 14 integrally connected with one another and with the bottom wall 5 and with the adjacent outer walls 7 and 8, as the case may be. With respect to each of the cells 12 contiguous to one or more of the outer walls two of the divider web ends integrally join the outer walls. Thus, for each of the cells bound only by the side walls 7, two of the divider web ends are integral with such side wall. With respect to the cells 12 located at the corners of the carrier a divider web is in endwise connection with the adjacent side wall 7 and another of the divider ends is in endwise connection with the adjacent end wall 8. Along the ends of the carrier between the corner cells the intervening cells 12 have each two divider ends integral with the contiguous outer or end wall 8.

Bounding a limited, longitudinally elongated area centrally within the tray area of the carrier is a vertical, inner spacer wall 15 affording a space take-up means between the innermost of the cells 12 which surround such inner wall. Each of such inner, surrounding cells 12 has two divider ends integral with the inner wall.

All of the several cell divider webs 14 are mutually integrally interconnected by joining of all of the divider ends which are contiguous to one another. At each of the divider junctures respective, generally triangularly cross-sectioned vertical juncture bars 17 are provided for reinforcement against any tendency toward buckling under vertical loads. To facilitate drainage in cleaning or from condensate running from carried bottles, and also to facilitate refrigerated air circulation, substantial openings 18 are provided in the bottom wall 5 in alignment with the juncture posts 17, and as best seen in FIGURES 2 and 3, such openings have substantial upward extensions 19 in the aligned juncture portions of the divider webs.

In order to facilitate stacking registration of empty carriers on one another, certain of the reinforcing bars 17 are provided with respective upwardly projecting registration bosses or lug extensions 20 of limited height and adapted to extend into registering relation within the aligned holes 18 and the upward extensions 19 thereof in a stacked carrier bottom. Thickened radial reinforcing and alignment vanes 21 integral with the subjacent partition webs 14 extend from the respective lugs 20 to a diameter slightly less than the diameter of the walls defining the registration openings 18. Desirably, four of the registration lugs 20 are provided, one being located on each of the divider web junctures nearest each of the corners of the carrier, in a symmetrical relationship. By having a plurality of the stacking alignment lugs or bosses 20, any one or more of them may be damaged or even broken off due to rough handling, but the remaining of such lugs will serve to align the stacked containers.

To afford frictional surface to minimize undesirable slippage on a supporting surface, a substantial aggregate area of the underface of the base or bottom wall 5 lies in a common supporting plane. However, in order to afford reinforcement for the bottom wall against sagging under the weight of bottles in the cell areas, in order to effect reinforcing tie-in of such base wall areas in the cells, and in order to afford downwardly opening registration pockets for the crowns of bottle caps for loaded stacking of the carrier, an advantageous pattern of elevated reinforcing ribs and bottle cap accommodating socket areas is provided on the base wall. For this purpose, each of the base wall areas in each of the cells 12 has a central upwardly offset preferably circular flat area 22 connected with the normal plane of the base wall by means of a reinforcing offsetting tapered generally annular flange 23. This affords in the bottom of each of the cells a downwardly opening shallow pocket or socket recess 24 nestably receptive of the crown of a bottle cap, as indicated in dash outline in FIGURE 3, when stacking cases with filled bottles, or to receive the top end of a filled bottle when stacking carriers of empty bottles. Thereby, freedom from accidental sliding displacement of the stacked carriers either longitudinally or laterally from the stack is attained.

Further reinforcement of the base wall areas is attained by having a pattern of raised shallow reinforcing ribs 25 radiating symmetrically from the raised, offset areas 22. In a desirable arrangement, a pattern of six reinforcing ribs 25 radiates in equidistantly spaced relation from the offset area 22 in each of the cells. These ribs 25 extend integrally through and in reinforcing relation to the divider webs 14 which provide common cell walls between cells. Those of the reinforcing ribs 25 which terminate at the outer and inner walls, respectively, run into and blend with such walls in reinforcing relation. Since the ribs 25 are desirably downwardly hollow for material and weight saving purposes, the ends of those ribs which terminate in junctures with the outer walls are closed off by means of integral closure flanges 27 as typified in FIGURE 2. As best seen in FIGURE 1, the reinforcing ribs 25 afford an over-all pattern of reinforcement along longitudinal and crossing diagonally extending transverse lines.

Over the spacer area afforded by the inner walls 15, a central carrying handle 28 is provided. In this instance, the handle 28 is constructed integrally with the inner wall 15 and projects upwardly to a height relative to the base wall 5 which is at least slightly less than the height of bottles to be carried by the carrier, as visualized in FIGURE 3.

In a desirable construction, the handle 28 is of generally inverted U-shape in side elevation and includes a horizontal longitudinal hand grip or handle bar 29 of upwardly opening U-shape in cross-section with its under surface rounded for comfortable gripping. At each end, the handle bar 29 is integrally united with respective end riser struts or legs 30. Each of the handle legs 30 is of inwardly and downwardly opening hollow, generally U-shaped cross-section structure including opposite side wall flanges 31. A vertical integral reinforcing web 32 extends from juncture of each leg 30 with the hand grip bar 29 and downwardly between the side flanges 31 to a free end portion which extends downwardly a substantial though limited distance below the top edge of and is integral at its sides with the inner wall 15. At their lower end portions aligned with the lower end portion of the integral reinforcing web 32, the side flanges 31 have reinforcing integral connecting terminals 33 comprising thickenings of the upper contiguous inner marginal portions of the wall 15. This affords a quite rigid handle structure which is thoroughly reinforced against deformation either longitudinally or transversely.

Below the handle the inner wall 15 defines a hollow which is freely open downwardly and opens upwardly under the hand grip bar 29. Along its upper edge between the side flanges 31 of the handle legs, the wall 15 has an inwardly projecting reinforcing rib 34 along each side.

By having the handle complementally narrower and shorter at its base than the downward opening from the space within the wall 15, and tapering upwardly, by having the height of the handle no greater above the top edge defining the wall 15 than the available vertical space within the inner wall hollow, reception of the handle within such hollow space during stacking of the containers is enabled. Further, by having the longitudinal and transverse distance between the outside base junctures of the legs 30 dimensioned to fit generally nestingly within the downward opening defined by the inner wall 15, assistance in stacking registration of the carriers, when empty, is afforded, additional to the registration provided by the upstanding registration lugs or bosses 20.

For additional convenience in manipulation, the carrier is provided at least on one end, and preferably at both ends, with additional handle structure enabling ready pulling of the carrier endwise along a supporting surface. To this end, those areas at the ends of the inner six-cell rows, and comprising approximately half of a symmetrically hexagonal cell area are used to accommodate handle structure. In these end areas, the respective end walls 8 are inset in bounding relation to the contiguous cells 12 and provide outwardly opening flaring respective handle openings 35. Across the outer sides of the upper end portions of the handle recesses respective thickened cross-section integral handle bar portions 37 are provided having an outer plane flush with the plane of the integral end wall 8 at each side of the respective handle recess. Along the upper edge of the handle bar 37 the outwardly projecting reinforcing rib 11 extends reinforcingly. Reinforcement for the lower edge of the handle bar 37 is afforded by an integral connecting flange 38 which extends inwardly and upwardly obliquely and integrally joins the inset portion of the end wall 8 defining the vertical handle recess 35. To enhance ready gripping thereof, the downwardly facing surface of the handle flange 38 is provided with a series of transverse serrations 39 in each instance. Through this arrangement, not only does each of the handle structures 37, 38 enable ready grasping thereof from underneath by the fingers of the hand other than the thumb and with the thumb engaging over and behind the handle bar 37, but just the reverse grasping is enabled wherein the fingers other than the thumb are received downwardly within the upwardly opening pocket behind the handle bar 37, with the thumb engaging the serrations 39, if desired.

For ready drainage in washing of the carrier, and the like, each of the handle flanges 38 is provided with a drain hole 40 at its lowest margin. Further, for drainage purposes, each of the depressed areas within each of the cells 12 between the reinforcing ribs 25, and not drained by one of the holes 18, is provided with a drain hole 41.

From the foregoing, it will be apparent that the present invention provides a unique thirty-bottle capacity carrier which can be carried with utmost convenience by means of the central upstanding handle, but which can also be readily manipulated by means of the handle structures contained on and within the ends of the carrier. Since all of the outside and inside walls as well as the cell divider partition webs are in a common plane, stacking of the containers without stress or strain is facilitated. When empty carriers are stacked to substantial height there is virtually solid support from top to bottom through the registering vertical walls and dividers. The same is true where a filled or loaded carrier is stacked on an empty carrier. By virtue of the extensive reinforcement of the base areas of the respective cells with the reinforcement tied into the vertical walls and the divider webs, stacking of loaded carriers on the tops of bottles in subjacent carriers is thoroughly provided for. By having the bottle supporting ribs in the base wall areas of the respective cells of downwardly hollow structure, such reinforcing ribs provide some protective cushioning or shock absorption for the bottle load due to the inherent resilience of the plastic material even though the material is of substantial self-sustaining rigidity.

In a practical embodiment of the invention, the tray has been provided with maximum outside dimensions comprising eighteen inches in length and eleven and nineteen thirty-second inches in width, measured from the maximum projection of the reinforcing buffer rib 11, with a height of four inches to the tops of the upstanding walls and cell divider webs, the top of the handle 28 rising to seven and one-eighth inches. A thickness of the bottom 5 and in the outer and inner upstanding walls of 0.80" has been found satisfactory. A somewhat thinner section has been found suitable in the divider webs 14, comprising .065" at the base and tapering to .045" at the upper edge. In the handle 28 the typical section thickness of the legs 30 and the webs 32 have been found suitable at .080" thickness with the webs tapering downwardly for molding draft. In the handle grip bar 29 a suitably thicker section is desirably utilized as is evident in the cross-section in FIGURE 3. While the handle webs 38 may be of the typical .080 inch thickness, desirably the end handle bar sections are thicker, such as about ⅛". Each of the three-sided juncture posts 17 has desirably been provided with a section measuring about three thirty-seconds inch from the post axis to each flat face, and each of the centering webs 21 has also been constructed of about three thirty-second inch thickness.

As a result, a carrier of the most economical size with respect to occupied space in relation to capacity, and of minimum weight and utmost economy of material has been provided. An extremely rugged structure has been attained by the generally honeycomb bottle-receiving cell or compartment configuration and the integral reinforcement afforded by the cell dividers integrally interconnected with one another and integrally connecting the outer and inner upstanding walls and the base wall with its efficient pattern of reinforcement ribs and angular flange structures.

It will be understood that modifications and variations may be effected without departing from the scope of the novel concepts of the present invention.

I claim as my invention:

1. A one-piece molded plastic carrier for bottles comprising:
   (a) a generally tray-like structure including a base and upstanding walls;
   (b) upstanding divider webs integral with said base and subdividing the area within the confines of said walls into 30 bottle receiving cell compartments comprising two longitudinal rows of seven, two longitudinal rows of six, and a longitudinally aligned set of four compartments.
   (c) said set of four compartments being arranged as two pairs of cell compartments aligned on a longitudinal center line of the carrier with a substantial space between the pairs;
   (d) and a carrying handle integrally joined to said base and to said divider webs in the space between said pairs of cell compartments.

2. A one-piece molded plastic carrier for bottles affording maximum capacity within minimum carrier area and comprising:
   (a) a generally tray-like structure including a base and upstanding outside walls defining the tray area;
   (b) and means subdividing the tray area into thirty bottle-receiving upwardly opening cellular compartments and including a generally honeycomb orientation of cell dividers integral with said base and said walls and defining twelve six-sided compartments and eighteen five-sided compartments.

3. A one-piece molded plastic carrier for bottles comprising:
 (a) a generally tray-like structure including a base wall, an outer wall rising from the perimeter of said base wall and defining the outside dimensions of the structure, and an inner centrally located wall defining a tubular cavity opening through said base wall, all of said walls being of substantially the same shell section thickness;
 (b) an upstanding handle of reinforced structure having leg portions spaced apart and attached to said inner wall, said inner wall having reinforcing ribs thereon between said handle legs;
 (c) integral upstanding divider webs on said base wall defining a first series of upwardly opening bottle-receiving cell compartments entirely surrounding and having divider web ends integral with said inner wall, and a second series of cell compartments having common divider web boundaries with and completely surrounding said first series of cell compartments and having web divider ends thereof integrally joining said outer wall;
 (d) a plurality of manipulating handle means in said outer wall including respective handle bars of thicker section flush with said outer wall, said outer wall having inset areas aligned with said bars and in each instance defining boundaries for three adjacent cell compartments, and a web integral with a lower margin of each of the handle bars and extending generally diagonally upwardly therefrom and integrally joined to the aligned inset wall portion, the lower surface of each of said webs having a roughened gripping surface;
 (e) and a reinforcing and buffer rib integral with and projecting outwardly from the upper edge portion of said outer wall entirely thereabout and extending along the upper edges of said handle bars.

4. A one-piece molded plastic carrier for bottles comprising:
 (a) a generally tray-like structure including a base, an outside wall structure and an inside wall structure, said wall structures defining therebetween a bottle-supporting tray area;
 (b) and means integral with said base and said walls and subdividing the tray area into individual bottle-receiving compartments, certain of said compartments having a boundary portion on said outside wall structure and other of said compartments having a boundary portion on said inside wall structure.

5. A one-piece molded plastic carrier for bottles comprising:
 (a) a generally tray-like structure including a base and inner and outer walls defining a bottle-supporting tray area therebetween and entirely about said inner wall;
 (b) integral dividers on said base in said area defining a series of bottle-receiving cells having common dividers and completely surrounding said inner wall with two ends of the dividers defining each of the cells integrally connected to said inner wall;
 (c) and a second series of cells completely surrounding said first series with common boundaries on said first series and with respect to each other, two divider ends defining each of said second series of cells being integral with said outer wall.

6. A molded plastic bottle-carrier comprising:
 (a) base and upstanding walls defining a tray area;
 (b) a generally honeycomb arrangement of divider webs on said area subdividing the same into individual bottle-receiving cells, each web having at least one end joined integrally with the ends of two adjacent webs, and each of the three-end junctures comprising a three-sided reinforcing juncture post;
 (c) said base having drainage openings aligned with said junctures, and said junctures having in the lower end portions thereof upward extensions of said drainage openings;
 (d) and certain of said posts having upwardly projecting stacking alignment boss lug extensions adapted to engage in the drainage openings aligned with corresponding juncture posts of a stacked similar carrier.

7. A molded plastic bottle-carrier of the character described comprising:
 (a) a base, outer and inner walls defining a bottle-receiving tray area, and said inner wall defining a tubular cavity opening through said carrier;
 (b) and an integral handle rising from the upper end of said inner wall comprising a hand grip bar and legs integrally joining the ends of said grip bar to said inner wall, said legs being of substantially U-shape in cross-section and opening downwardly and inwardly and having a vertical reinforcing web extending downwardly from adjacent juncture of the hand grip bar with the respective legs and terminating below the upper edge of said inner wall and integral therewith.

8. A molded plastic bottle-carrier of the character described comprising:
 (a) base and upstanding wall structures defining a carrying tray, integral dividers subdividing the tray into a generally honeycomb arrangement of individual bottle-receiving cells;
 (b) and handle structure comprising an inset area in said wall structure bounding a plurality of said cells and extending up and down opening outwardly, and a handle bar extending across the upper portion of said inset and having a lower margin, and a web integral with a lower margin of said bar and extending generally diagonally upwardly and inwardly and integrally joined to the portion of the wall defining the inset, said web and said bar affording an upwardly opening access clearance and the lower surface of the web having a roughened gripping surface.

9. A molded plastic bottle-carrier of the character described comprising:
 (a) a base and an upstanding outer wall structure defining a bottle-carrying tray, and dividers subdividing the tray into a pattern of upwardly opening bottle-receiving cell compartments, said wall structure having an outwardly opening vertically extending handle indentation;
 (b) and a handle bar extending integrally across the outer side of said indentation with its ends joining said wall structure at the respective opposite sides of said indentation, said handle bar having a lower edge, and a handle web extending obliquely inwardly and upwardly from said lower edge and joining said wall structure within said indentation, said web affording with the handle bar an upwardly opening finger-receiving pocket which is deeper adjacent to the handle bar and also affording a downwardly opening finger-receiving pocket which is deeper adjacent to the most indented portion of said wall structure to which the web is joined.

10. A one-piece molded plastic bottle-carrier of the character described comprising:
 (a) a base and upstanding inner and outer walls of predetermined thickness and defining a carrying tray area therebetween, said inner wall defining a vertical tubular space,
 (b) divider webs substantially thinner than said side walls rising from said base and subdividing said tray area into a substantially honeycomb pattern of bottle-receiving cells comprising an inner row of said cells surrounding said inner wall and having a boundary common to said inner wall with the webs separating the inner row of cells integrally joining said inner wall, and an outer row of cells surrounding said inner row of cells and having respective boundary portions common to said outer wall and with divider webs bounding the same joining said outer wall, a continuous row of divider webs separating said rows of cells, and each of said continuous row of divider webs joining at least one of the divider webs which join either of said walls.

11. A one-piece molded plastic bottle-carrier of the character described comprising:
   (a) a base and outer walls upstanding therefrom jointly defining a carrying tray having outside dimensions within the outside dimensions of a standard 24-bottle wooden case,
   (b) and divider webs subdividing the area within the tray into at least 30 bottle-receiving cells to accommodate bottles of the same size as the wooden case.

12. A bottle-carrier as defined in claim 11, in which the divider webs subdivide said area into 33 bottle-receiving cells.

13. In a one-piece molded plastic bottle-carrier of the character described:
   (a) a substantially rectangular elongated base having on its edges upstanding end and side walls joined together and defining a perimeter about a tray area;
   (b) dividers integral with said base wall and said upstanding walls subdividing the tray area into a generally honeycomb arrangement of individual bottle-receiving cells including outside cells which are bounded by said walls;
   (c) and the outside cells bounded by said end walls having at each end wall a pair of spaced upwardly opening manipulating finger-receiving pockets of substantially half-cell area adjacent to the respective end wall and separated by one of said outside cells bounded by the respective end wall in said perimeter.

References Cited
UNITED STATES PATENTS

| | | | |
|---|---|---|---|
| D. 148,488 | 1/1948 | Shank. | |
| 2,535,493 | 12/1950 | Gerber | 220—97 |
| 2,619,251 | 11/1952 | Schmidt | 220—94 |
| 2,970,715 | 2/1961 | Kappel et al. | 220—21 |
| 2,974,819 | 3/1961 | Melville | 220—20 |
| 3,261,495 | 7/1966 | Beesley et al. | 220—21 |
| 3,281,010 | 10/1966 | Moore et al. | 220—102 |
| 3,283,947 | 11/1966 | Cornelius | 220—102 |

FOREIGN PATENTS
686,780   5/1964   Canada.

OTHER REFERENCES
"Modern Plastics" magazine article entitled "Here Come the Beverage Cases," published August 1963, pp. 78–83, by McGraw-Hill Inc.

DONALD F. NORTON, *Primary Examiner.*

JOSEPH R. LECLAIR, DAVIS T. MOOREHEAD, *Examiners.*

G. O. RALSON, *Assistant Examiner.*